(12) United States Patent
Tabe

(10) Patent No.: US 7,330,809 B2
(45) Date of Patent: Feb. 12, 2008

(54) TRACE DATA COMPRESSION SYSTEM AND TRACE DATA COMPRESSION METHOD AND MICROCOMPUTER IMPLEMENTED WITH A BUILT-IN TRACE DATA COMPRESSION CIRCUIT

(75) Inventor: Tetsuya Tabe, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 615 days.

(21) Appl. No.: 10/395,339

(22) Filed: Mar. 25, 2003

(65) Prior Publication Data
US 2004/0073838 A1 Apr. 15, 2004

(30) Foreign Application Priority Data
Mar. 26, 2002 (JP) ............................. 2002-086737

(51) Int. Cl.
| | |
|---|---|
| *G06F 9/455* | (2006.01) |
| *G06F 9/44* | (2006.01) |
| *G06F 9/00* | (2006.01) |
| *G06F 7/00* | (2006.01) |
| *G06F 7/02* | (2006.01) |
| *G06F 7/04* | (2006.01) |
| *G06F 13/00* | (2006.01) |
| *G06F 13/12* | (2006.01) |
| *G06F 13/38* | (2006.01) |

(52) U.S. Cl. ........................... 703/23; 708/203; 710/68; 717/128

(58) Field of Classification Search .................. 703/23; 708/203; 710/68; 717/128
See application file for complete search history.

(56) References Cited

U.S. PATENT DOCUMENTS 5,724,505 A    3/1998   Argade et al.

6,191,710 B1 * 2/2001 Waletzki ....................... 341/63

(Continued)

FOREIGN PATENT DOCUMENTS

JP          61-278947          12/1986

(Continued)

OTHER PUBLICATIONS

Fox et al. "Compressing Address Trace Data for Cache Simulations" IEEE, 1997, 1 page.*

(Continued)

*Primary Examiner*—Kamini Shah
*Assistant Examiner*—Suzanne Lo
(74) *Attorney, Agent, or Firm*—Oblon, Spivak, McClelland, Maier & Neustadt, P.C.

(57) ABSTRACT

A trace data compression system includes a data acquisition circuit which is configured to acquire address information for identifying an address for reading or writing operation of a microcomputer which performs predetermined processing, and data information as operand data stored in the address; an address information compression circuit which is configured to compress the address information having been acquired by the data acquisition circuit and output the address information as compressed; a data information compression circuit which is configured to compress the data information having been acquired by the data acquisition circuit and output the data information as compressed; a data output circuit which is configured to output variable length data containing the address information having been compressed and outputted by the address information compression circuit and the data information having been compressed and outputted by the data information compression circuit.

7 Claims, 14 Drawing Sheets

U.S. PATENT DOCUMENTS

| | | | |
|---|---|---|---|
| 6,298,394 B1 | 10/2001 | Edwards et al. | |
| 6,670,897 B1 * | 12/2003 | Lin | 341/65 |
| 6,691,207 B2 * | 2/2004 | Litt et al. | 711/108 |
| 6,732,307 B1 * | 5/2004 | Edwards | 714/724 |
| 6,802,031 B2 * | 10/2004 | Floyd et al. | 714/45 |
| 6,985,848 B2 * | 1/2006 | Swoboda et al. | 703/26 |
| 7,043,668 B1 * | 5/2006 | Treue et al. | 714/45 |
| 2006/0225050 A1 * | 10/2006 | Thekkath | 717/128 |

FOREIGN PATENT DOCUMENTS

| | | |
|---|---|---|
| JP | 3-236680 | 10/1991 |
| JP | 3-296818 | 12/1991 |
| JP | 6-282468 | 10/1994 |
| JP | 10-275092 | 10/1998 |
| JP | 2000-267876 | 9/2000 |
| JP | 2000-332205 | 11/2000 |
| JP | 2001-147834 | 5/2001 |

OTHER PUBLICATIONS

Eric E. Johnson, et al., "Lossless Address Trace Compression For Reducing File Size And Access Time", Proceedings of the Annual International Phoenix Conference on Computers and Communications, vol. 13, XP-000462559, Apr. 12, 1994, pp. 213-219.

M. Helms, et al., "Event Monitoring in a System-on-a-Chip", ASIC/SOC Conference, XP-010360258, Sep. 15, 1999, pp. 233-237.

* cited by examiner

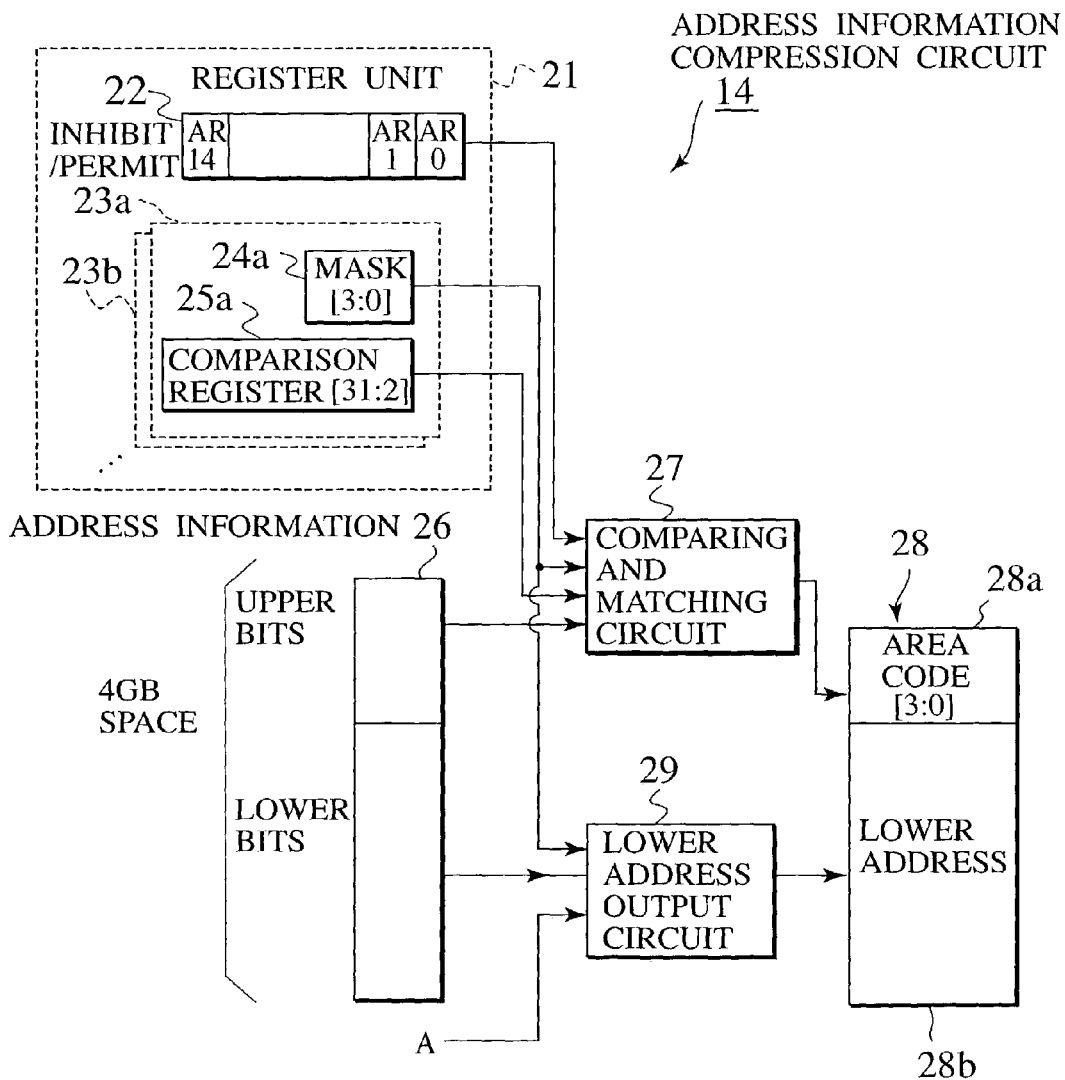

FIG. 6

POSSIBLE PATTERNS

DATA

| | 31  2423  1615  87  0 | BE[3:0] |
|---|---|---|
| (a) | | 1 1 1 1 |
| (b) | | 0 0 0 1 |
| (c) | | 0 0 1 1 |
| (d) | | 0 1 1 1 |
| (e) | | 0 0 1 0 |
| (f) | | 1 1 1 0 |
| (g) | | 1 0 0 0 |
| (h) | | 0 1 0 0 |
| (i) | | 1 1 0 0 |

FIG. 7

IMPOSSIBLE PATTERNS

DATA

| | 31  2423  1615  87  0 | BE[3:0] |
|---|---|---|
| (a) | | 0 0 0 0 |
| (b) | | 0 1 0 1 |
| (c) | | 1 0 0 1 |
| (d) | | 1 0 1 0 |
| (e) | | 1 0 1 1 |
| (f) | | 1 1 0 1 |

FIG. 14
| ADDRS | DATA | R/W | TOVR |
|-------|------|-----|------|
| 100   | 55   | R   |      |
| 200   | AA   | W   |      |
| ??    | ??   | ?   | OVR  |
| 1000  | 01   | W   |      |
| ??    | ??   | ?   | OVR  |
|       |      |     | TOTAL 2 |
FIG. 15
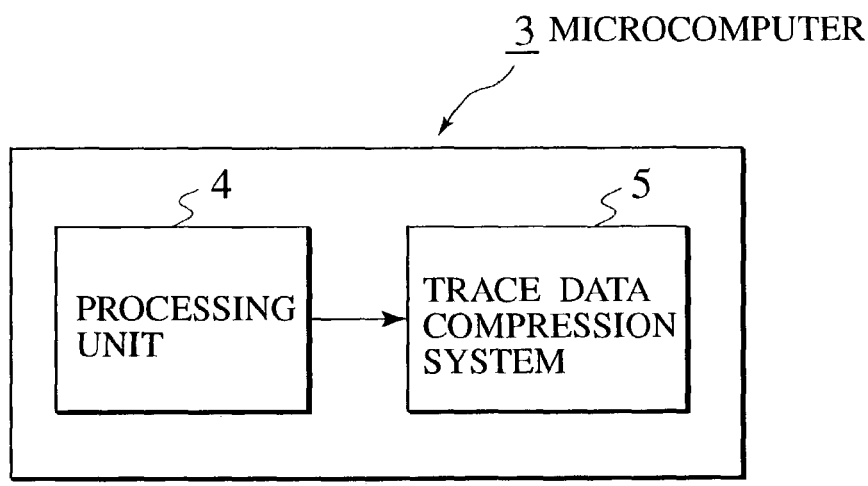
FIG. 16
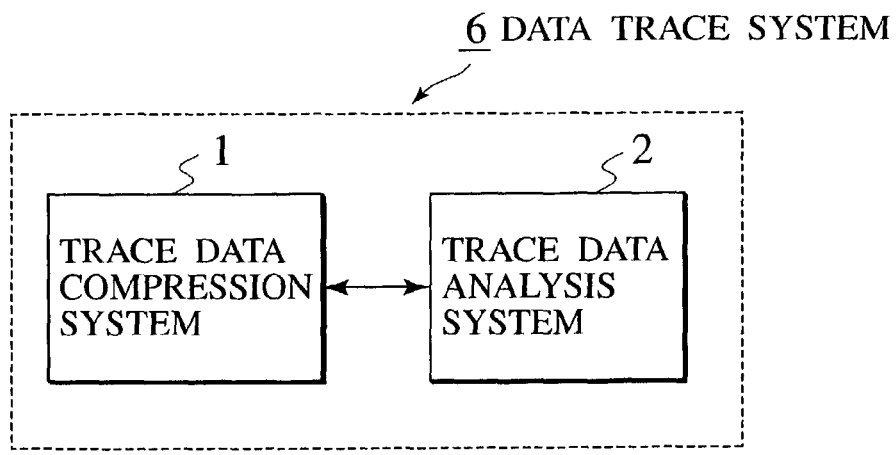

TRACE DATA COMPRESSION SYSTEM AND TRACE DATA COMPRESSION METHOD AND MICROCOMPUTER IMPLEMENTED WITH A BUILT-IN TRACE DATA COMPRESSION CIRCUIT

CROSS REFERENCE TO RELATED APPLICATIONS

This application is based upon and claims the benefit of priority from the prior Japanese Patent Applications P2002-086737 filed on Mar. 26, 2002; the entire contents of which are incorporated herein by reference.

BACKGROUND OF THE INVENTION

1. Field of the Invention

The present invention is related to a trace data compression system and a trace data compression method. This system and method provide for compressing and outputting address information for identifying an address for reading or writing operation of a microcomputer. The microcomputer performs predetermined processing and data information as operand data stored in the address, and a microcomputer capable of performing predetermined processing and implemented with a built-in trace data compression circuit for compressing trace data as processed by this predetermined processing.

2. Description of the Related Art

In recent years, with the rapid increase of microcomputer use, many machines have been equipped with microcomputer(s). A microcomputer is implemented within an IC chip on which are integrated all the necessary functional capabilities required for computing and processing a variety of information. Microcomputers are classified by the data width handled at once such as 4 bits, 8 bits, 16 bits, 32 bits. Microcomputers are used, as built-in devices, in vehicles, Digital TV, vacuum sweepers, microwave ovens, refrigerators, air conditioners, automobiles and other electric appliances.

A microcomputer can be connected to a personal computer and the like so that an engineer can program the microcomputer with the personal computer in order to implement predetermined processes. Therefore, verification (debugging) is inevitable, whether the program is exact or not. There are a variety of debug techniques such as measuring the time required for processing data, evaluating data as output after inputting and processing a test data stream, and the like. Furthermore, debugging techniques include data trace, i.e., obtaining a data access history to a memory, I/O ports and so forth.

FIG. 1 shows a prior art data trace system. The prior art data trace system as illustrated in FIG. 1 is composed of a target system 103 provided with an IC socket, an emulation chip (evaluation chip) 105 which is connected to the IC socket through a cable in place of a microcomputer as a test target and capable of performing the same processes as the microcomputer under test. A personal computer 101 traces input/output operations of the emulation chip. In this case, the personal computer 101 and the emulation chip 105 are referred to as a data trace information collection system.

However, in accordance with the data trace system as illustrated in FIG. 1, processes are performed by the emulation chip 105 capable of performing the same processes as the microcomputer rather than the microcomputer under test itself. The emulation chip 105 is fabricated on a circuit scale of from hundreds of thousands of gates to several millions of gates at a cost of from several million yen to several tens of million yen. Also, since the microcomputer under test is not directly debugged, it is impossible to perform sufficient debugging depending upon the accuracy of the emulation chip 105. Furthermore, there are difficulties in the connection between the emulation chip 105 and the IC socket. Furthermore, since a probe dedicated for this purpose is used for connection, the emulation chip sometimes does not operate properly due to cable noise.

A data trace system designed in order to solve these problems is illustrated in FIG. 2. In the data trace system as illustrated in FIG. 2, it is possible to trace data from the target system 103 through a DSU-ICE 102 by the use of a personal computer 101.

In the data trace system as illustrated in FIG. 2, it is possible to directly debug the microcomputer. Accordingly, as compared with the data trace system as illustrated in FIG. 1, there are advantages that the cost required for fabricating the emulation chip can be eliminated, that reliable debugging is possible by directly debugging the microcomputer and so forth.

However, in the case where a 32 bit microcomputer is debugged with the data trace system as illustrated in FIG. 2, seventy (70) output terminals have to be provided, i.e., 32 bits for address information, 32 bits for data (operand) information and 6 bits for status information. Because of this, the scale of a microcomputer tends to increase as well as increasing cost.

On the other hand, some microcomputers with fewer terminals are available. However, in the case of these types of microcomputers, trace information has to be broken up or dividen for outputting. From this, many cycles are required to output the entire information so that successive data is overlapped and therefore only a small proportion of the entire information is available for debugging.

SUMMARY OF THE INVENTION

An aspect of the present invention provides a trace data compression system comprising: a data acquisition circuit which is configured to acquire address information for identifying an address for at least one of a reading and writing operation of a microcomputer which performs predetermined processing, and data information as operand data stored in the address; an address information compression circuit which is configured to compress the address information having been acquired by the data acquisition circuit and output the address information as compressed; a data information compression circuit which is configured to compress-the data information acquired by the data acquisition circuit and output the data information as compressed; a data output circuit which is configured to output variable length data containing the compressed address information and outputted by the address information compression circuit and the compressed data information and outputted by the data information compression circuit.

Another aspect of the present invention provides a trace data compression method comprising: a step of acquiring address information for identifying an address for at least one of a reading and writing operation of a microcomputer which performs predetermined processing, and data information as operand data stored in the address; a step of compressing the address information acquired by the data acquisition circuit and output the address information as compressed; a step of compressing the data information acquired by the data acquisition circuit and output the data information as compressed; a step of outputting. variable length data containing the compressed address information and outputted by the address information compression circuit and the compressed data information and outputted by the data information compression circuit.

A further aspect of the present invention provides a microcomputer capable of performing predetermined processing and implemented with a built-in trace data compression circuit which is configured to trace data as processed by the predetermined processing, the microcomputer comprising: a processing circuit which is configured to perform the predetermined processing; a data acquisition circuit which is configured to acquire address information and data information relating to data access operation of the processing circuit; an address information compression circuit which is configured to compress the address information acquired by the data acquisition circuit and output the address information as compressed; a data information compression circuit which is configured to compress the data information acquired by the data acquisition circuit and output the data information as compressed; a data output circuit which is configured to output variable length data containing the compressed address information and outputted by the address information compression circuit and the compressed data information and outputted by the data information compression circuit.

BRIEF DESCRIPTION OF DRAWINGS

FIGS. 4A to 4B are functional block diagrams showing the address information compression circuit in details in accordance with the first embodiment of the present invention.

FIG. 6 is a schematic view showing examples of bit pattern information in accordance with the first embodiment of the present invention.

FIG. 7 is a schematic view showing examples of bit pattern information which are impossible to output in the operation of the microcomputer in accordance with the first embodiment of the present invention.

FIG. 14 shows one example of trace data which is output from the trace data analysis system as displayed in a screen.

FIG. 15 is a functional block diagram showing a microcomputer in accordance with a third embodiment of the present invention.

FIG. 16 is a system organization diagram showing a data trace system in accordance with a fourth embodiment of the present invention.

DETAILED DESCRIPTION OF THE INVENTION

Figure 1:
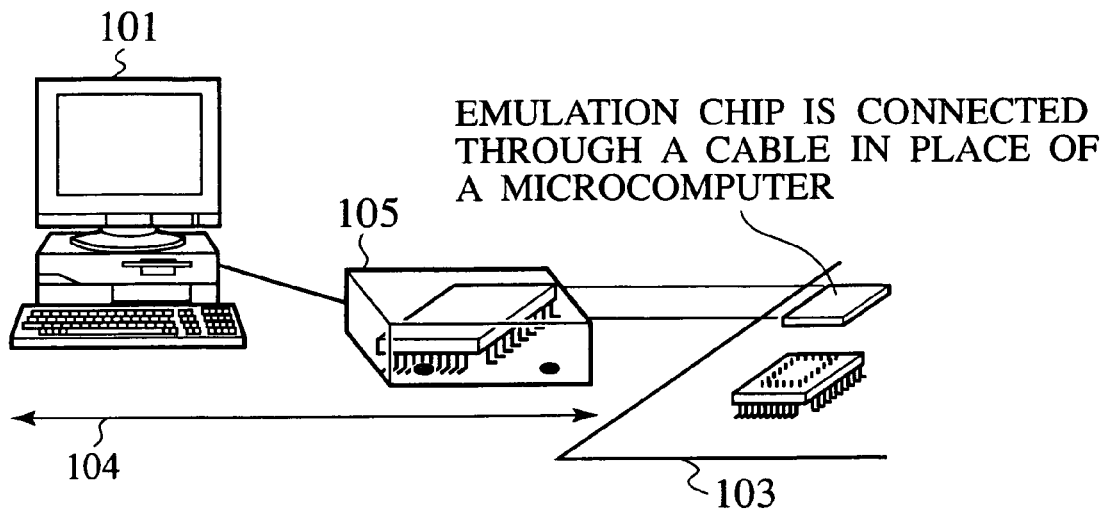
FIG. 1 shows a prior art data trace system (example 1).
Figure 2:
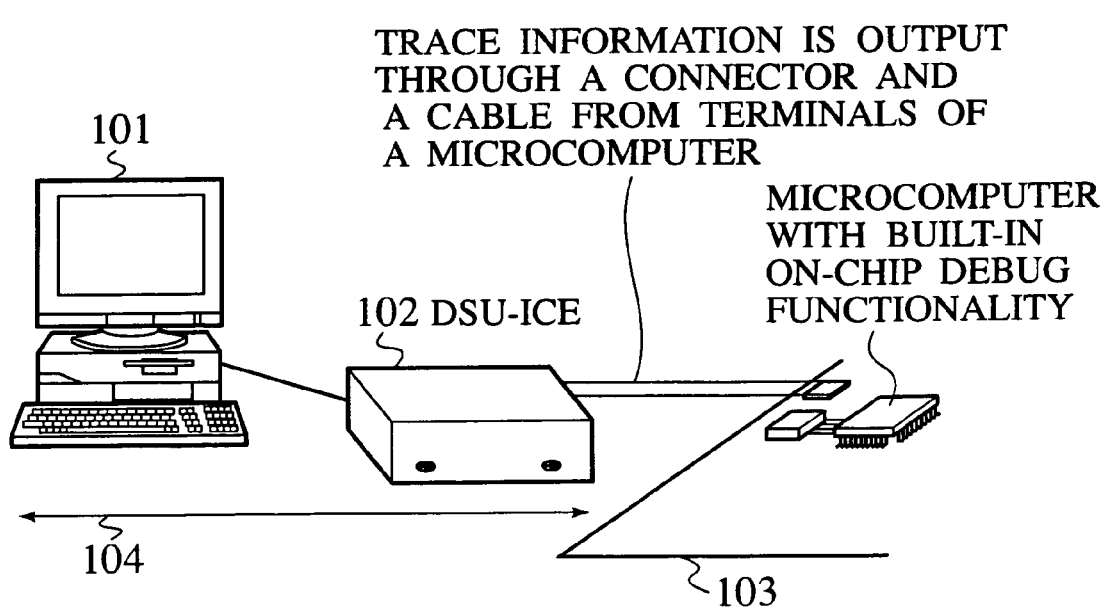
FIG. 2 shows a prior art data trace system (example 2).

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of semiconductor devices, it will be appreciated that the various drawings are not drawn to scale from one figure to another nor inside a given figure, and in particular that the layer thicknesses are arbitrarily drawn for facilitating the reading of the drawings.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

THE FIRST EMBODIMENT (Trace Data Compression System)

Figure 3:
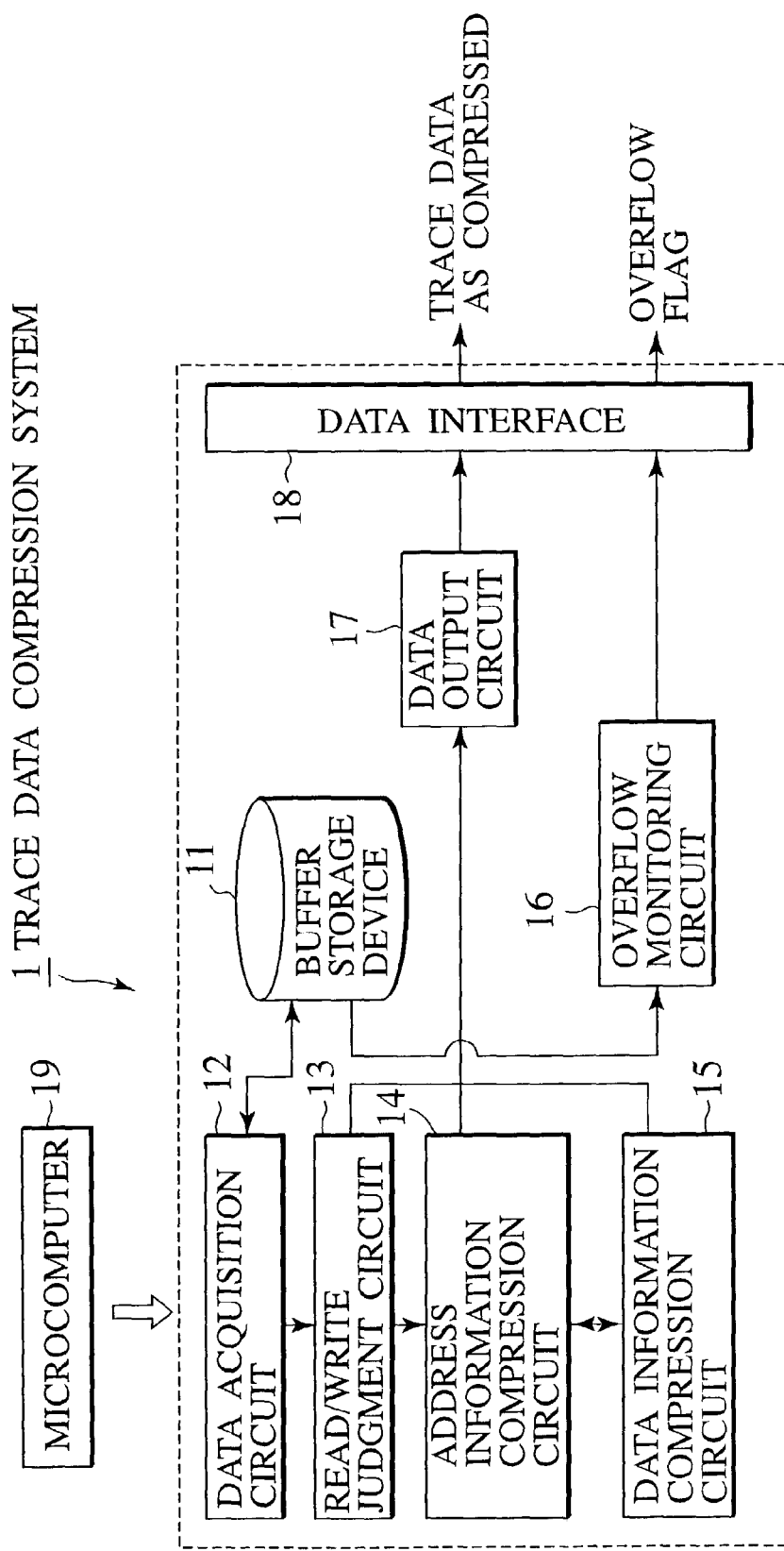
FIG. 3 is a functional block diagram showing a trace data compression system 1 in accordance with a first embodiment of the present invention.

FIG. 3 is a functional block diagram showing a trace data compression system 1 in accordance with a first embodiment of the present invention.

The trace data compression system 1 serves to compress and output address information for identifying addresses accessed for reading/writing by a microcomputer (CPU core) in order to perform predetermined processing of data information stored in said addresses.

For example, in the case where a 32 bit microcomputer is debugged, signals including 32 bits for address information, 32 bits for data information and 6 bits for status information totaling 70 bits are input to the trace data compression system 1, which then compresses the 70 bits signals to 9 bit signals and outputs the 9 bit signals through nine terminals.

Among the nine terminals, eight terminals are used to output information while the remaining one terminal is used to indicate the overflow status of the trace data compression system 1 when the task as required exceeds the throughput capacity thereof. In the case of the first embodiment of the present invention, the trace data compression system is capable of outputting trace data as compressed in synchronism with the operational clock frequency of the microcomputer 19, i.e., the data transfer rate of the trace data compression system corresponds to the operational clock frequency of the microcomputer 19. However, the trace data compression system can be designed so that the data transfer operation is in synchronism with clock signals at twice or half the operational clock frequency of the microcomputer 19.

When a data access request is issued in/from the microcomputer 19, the address information, the data information and the status information as associated are output through the eight information output terminals after being divided up.

The trace data compression system 1 in accordance with the first embodiment of the present invention is provided with a buffer storage device 11, a data acquisition circuit 12, a read/write judgment circuit 13, an address information compression circuit 14, a data information compression circuit 15, an overflow monitoring circuit 16, a data output circuit 17, and a data interface 18.

The buffer storage device 11 is a storage device functioning as a buffer for storing data as outputted from the read/write judgment circuit, the address information compression circuit 14 and the data information compression circuit 15.

In the case where data access operation of the microcomputer 19 takes place anew in the middle of outputting the data access information of the microcomputer 19 through the eight output terminals after being divided, the new data is stored in this buffer storage device 11 so that the information as stored can be output in sequence when the data access operation is interrupted.

The data interface 18 is an output interface of the trace data compression system 1. The data interface 18 is provided with eight output terminals for outputting data and one output terminal for indicating the overflow status of the buffer storage device 11.

The data acquisition circuit 12 is a circuit serving to acquire, from the microcomputer 19, address information and data information associated with data access operations of the microcomputer 19. The address information and the data information may be temporarily stored in the buffer storage device 11 and obtained from the buffer storage device 11 in order to cope with the case where the data access operation is continuously repeated. In such a case, the information can be acquired in sequence when the data access operation is interrupted.

The read/write judgment circuit 13 is a circuit serving to judge or determine whether the microcomputer 19 accesses a certain address area for reading or writing data and to output a signal indicative of the judgment or determination. For example, a "0" for indicating the writing data or a "1" for indicating the reading data is output as a 1 bit signal.

The address information compression circuit 14 is a circuit serving to compress the address information as acquired by the data acquisition circuit 12 and to output the compressed data.

The data information compression circuit 15 is a circuit serving to compress the data information as acquired by the data acquisition circuit 12 and to output the compressed data.

The overflow monitoring circuit 16 is a circuit serving to monitor access to the buffer storage device 11 and to generate an overflow signal when a write operation is performed which exceeds the storage capacity of the buffer storage device 11. It is possible to obtain information about how many times and at what times the buffer storage device 11 overflows by counting the number of outputted overflow signals.

The data output circuit 17 is a circuit serving to output, through the data interface 18, the read/write judgment signal as outputted from the read/write judgment circuit 13 and the address information and the data information as compressed and outputted from the address information compression circuit 14 and the data information compression circuit 15. In this case, it is furthermore preferred to output variable-length data including effective information by adding a start bit. Furthermore, the variable-length data may be divided into packets and output in the form of packets.

(The Address Information Compression Circuit)

FIGS. 4A to 4B are functional block diagrams showing the address information compression circuit 14 in detail.

As illustrated in FIG. 4A, the address information compression circuit 14 is provided with a register unit 21, a comparing and matching circuit 27, a lower address output circuit 29 and trace nodes 28.

The address information compression circuit 14 serves to compress address information 26 which is the address information as acquired by the data acquisition circuit 12 and to output the address information 26 to the trace nodes 28. The address information 26 as outputted includes an upper address which is represented by an area code and a lower address. The term "upper address" as used herein refers generally to a sequence of upper bits of an address while the term "lower address" as used herein refers generally to a sequence of lower bits of the address. One complete address consists of an upper address and a lower address. Accordingly, the trace nodes 28 are composed of area code nodes 28a and lower address nodes 28b.

The register unit 21 is a register for registering, in advance, address areas which are frequently accessed. In the case as illustrated in FIGS. 4A to 4B, a maximum of 15 address areas can be registered. The register unit 21 is provided with an inhibit/permit register 22, a comparison address register 25a and a mask register 24a.

The comparison address register 25a is a register for storing an upper address which is frequently accessed. For example, it is possible to store an upper address such as an upper 4 bits, upper 8 bits and upper 16 bits. In this case, a maximum of 30 bits can be stored as the upper address for comparison, i.e., from the 31st bit to the 2nd bit, as ordered, from the 0th bit.

The mask register 24a is a register for masking data as stored in the comparison address register 25a. The 3rd bit of the mask register 24a serves to mask bits from the 31st bit to the 24th bit; the 2nd bit of the mask register 24a serves to mask bits from the 23rd bit to the 16th bit; the 1st bit of the mask register 24a serves to mask bits from the 15th bit to the 8th bit; and the 0th bit of the mask register 24a serves to mask bits from the 7th bit to the 0 bit; The output range of the lower bits of an address can be adjusted in accordance with the mask register 25a. Accordingly, the bit length of an address as output can be adjusted in bytes in accordance with the range as designated by the mask.

Fifteen circuits 23a to 23o are provided, each of which is provided with a comparison address register and a mask register, for example, the comparison address register 25a and the mask register 24a, in order to register fifteen upper addresses.

Also, the inhibit/permit register 22 is provided which is used to control whether or not each of the fifteen circuits 23a to 23o are used. The inhibit/permit register 22 is a fifteen bits register capable of controlling each of the fifteen circuits 23a to 23o are used.

The comparing and matching circuit 27 is a circuit for comparing the comparison addresses of the register unit 21 and the address information 26 as acquired by the data acquisition circuit 12. When an upper address stored in the comparison address register 25a and masked by the mask register 24a matches with the upper address contained in the address information 26, an area code is output as an identifier to the upper address in the comparison address register 25a and masked by the mask register 24a. In this description of the embodiment of the present invention, the area code is referred to as AR[3:0].

In the case where it is possible to register fifteen addresses in the comparison address registers and the mask registers, the area code is implemented as 4 bit data from "0" to "14". Also, when the upper address stored in any comparison address register does not match in the comparing and matching circuit 27, the area code as output is "15" (0xf in hexadecimal).

Figure 5A:
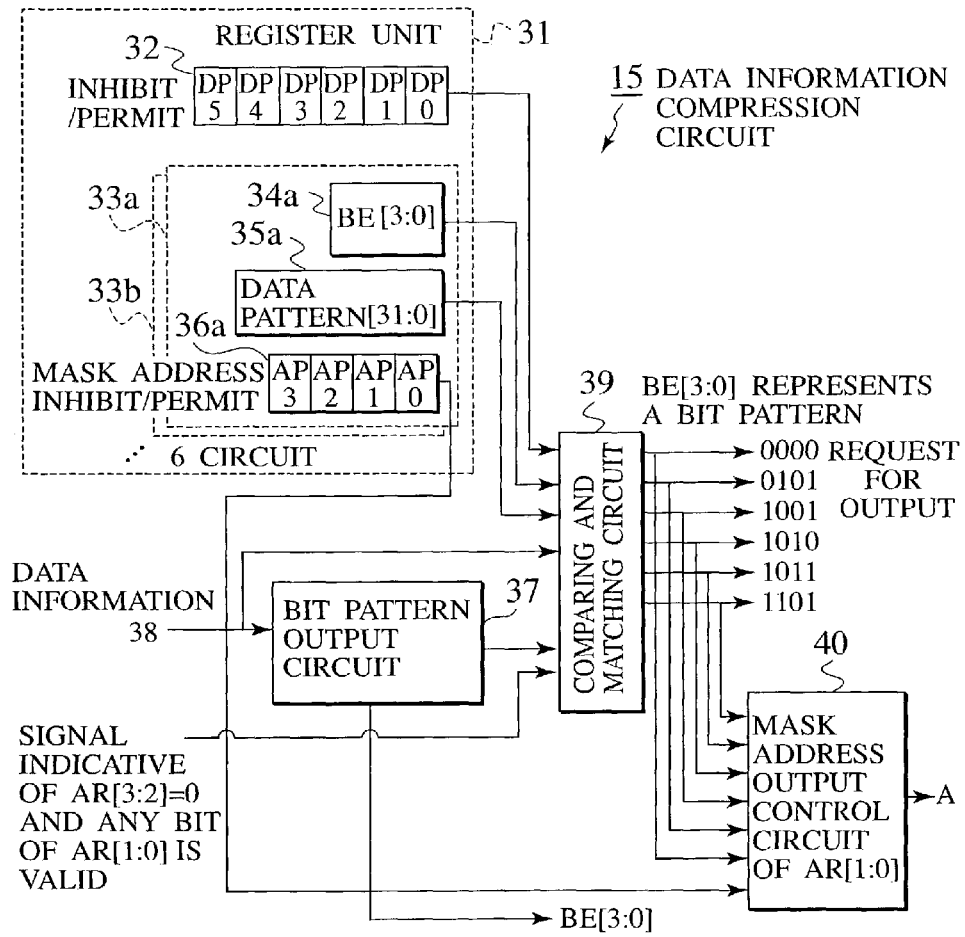
FIGS. 5A to 5B are functional block diagrams showing the data information compression circuit in details in accordance with the first embodiment of the present invention.

The lower address output circuit 29 is a circuit serving to mask an address and to output the address to the lower address nodes 28b with reference to the mask register 24a and an address A as outputted from a mask address output circuit 29 as described below and as illustrated in FIG. 5A.

FIG. 4B is a schematic view showing the register set required for registering an upper address. An upper address is registered by means of 30 bits of comparison address register together with one bit of the inhibit/permit register and four bits of a mask register.

In accordance with the address information compression circuit of the embodiment of the present invention, it is possible to make use of a shorter bit length for representing an upper address by registering address areas which are frequently accessed.

Because of the nature of operation of the microcomputer 19, addresses which are accessed during a certain task tend to be localized within a neighbor address area for the purpose of improving the processing speed. Accordingly, a memory is not randomly accessed throughout the entirety of the address space but tends to be accessed only within a certain local area.

The address information can be compressed by registering the common upper bits of the addresses in such an area as an upper address.

In the case where the present embodiment is applied to a 32 bit microcomputer and where an upper address of upper 24 bits is registered in advance, 24 bit data can be compressed to a 4 bit area code. Furthermore, a lower address is outputted as lower 8 bit data so that 32 bit address is compressed to 12 bits.

(The Data Information Compression Circuit)

Figure 5B:
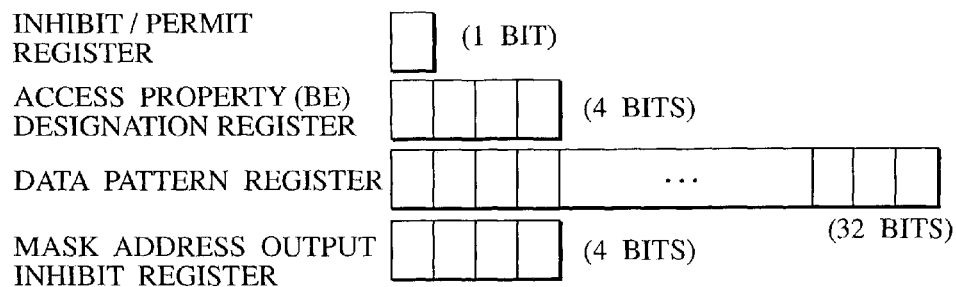

FIG. 5 is a functional block diagram showing the data information compression circuit 15 in detail. The data information compression circuit 15 is provided with a bit pattern output circuit 37, a register unit 31, a comparing and matching circuit 39 and a mask address output control circuit 40.

The bit pattern output circuit 37 of the data information compression circuit 15 will be described in greater detail.

The bit pattern output circuit 37 is a circuit to divide the data information 38 into a plurality of lanes in bytes, and to output bit pattern information in which each byte lane containing valid data is validated while each byte lane containing no valid data is invalidated. Where the microcomputer 19 is 32 bits, the bit pattern information is 4 bit data indicative of whether or not each byte of the 4 bytes is valid. In this description of the embodiment of the present invention, the bit pattern information is referred to as BE[3:0]. Here, BE is an abbreviation for Byte Enable.

FIG. 6 is a schematic view showing examples of bit pattern information. FIG. 6 shows possible patterns of valid byte(s) which the microcomputer 19 outputs.

The (a) pattern as illustrated in FIG. 6 is related to the so called word access by which 32 bits are fully used to access operand data. In this case, BE[3: 0]=1111.

The (b) pattern as illustrated in FIG. 6 is related to the so called byte access by which 8 bits are used to access operand data. When the lower 8 bits are used, BE[3:0]=0001.

The (c) pattern as illustrated in FIG. 6 is related to the so called half word access by which 16 bits are used to access operand data. When the lower 16 bits are used, BE[3:0]=0011.

The (d) pattern as illustrated in FIG. 6 is related to the access by which 24 bits are used to access operand data. When the lower 24 bits are used, BE[3:0]=0111.

The (e) pattern as illustrated in FIG. 6 is related to the access by which the 15th to 8th bits are used to access operand data, in which BE[3:0]=0010.

The (f) pattern as illustrated in FIG. 6 is related to the access by which the 31st to 8th bits are used to access operand data, in which BE[3:0]=1110.

The (g) pattern as illustrated in FIG. 6 is related to the access by which the 31st to 24th bits are used to access operand data, in which BE[3:0]=1000.

The (h) pattern as illustrated in FIG. 6 is related to the access by which the 23rd to 16th bits are used to access operand data, in which BE[3:0]=0100.

The (i) pattern as illustrated in FIG. 6 is related to the access by which the 31st to 16th bits are used to access operand data, in which BE[3:0]=1100.

Since each byte lane which does not contain valid data information is not output by the use of the bit pattern output circuit 37, it is possible to compress the data information.

For example, in the (b) pattern as illustrated in FIG. 6, 32 bit data is transmitted if the data information is not compressed. However, the bit pattern output circuit 37 in accordance with the embodiment outputs 4 bits as the byte lane information so that only the 7th to 0th bits are output as the data information totaling to 12 bits. Accordingly, in accordance with the bit pattern output circuit 37 of the present invention, it is possible to compress the data information to cut 20 bits therefrom.

Next, the circuits of the data information compression circuit 15 other than the bit pattern output circuit 37 will be described in greater detail.

The data information compression circuit 15 can compress routine patterns of fixed data such as "data fill" and "data clear". In this case, these routine patterns are assigned to the patterns of the bit pattern information which are impossible or infeasible to output because of the operational nature of the operation of the microcomputer 19.

FIG. 7 is a schematic view showing examples of bit pattern information which are impossible to output in the operation of the microcomputer 19. The "bit patterns which are impossible to output" are dependent upon the architecture of the microcomputer 19.

The (a) pattern as illustrated in FIG. 7 indicates that all of the 32 bits are invalid so that BE[3:0]=0000.

The (b) pattern as illustrated in FIG. 7 indicates that only the 23rd to 16th bits and the 7th to 0th bits are valid so that BE[3:0]=0101.

The (c) pattern as illustrated in FIG. 7 indicates that only the 31st to 24th bits and the 7th to 0th bits are valid so that BE[3:0]=1001.

The (d) pattern as illustrated in FIG. 7 indicates that only the 31st to 24th bits and the 15th to 8th bits are valid so that BE[3:0]=1010.

The (e) pattern as illustrated in FIG. 7 indicates that only the 31st to 24th bits and the 15th to 0th bits are valid so that BE[3:0]=1011.

The (f) pattern as illustrated in FIG. 7 indicates that only the 31st to 16th bits and the 7th to 0th bits are valid so that BE[3:0]=1101.

In accordance with the embodiment of the present invention, it is possible to assign routine patterns to BE[3:0]=0000, 0101, 1001, 1010, 1011 and 1101 as illustrated in FIG. 7.

The register unit 31 is used to register these bit patterns of BE[3:0] available for this purpose. A maximum of 6 routine patterns can be registered with BE[3:0] in the case as illustrated in FIG. 5. The register unit 31 is provided with an inhibit/permit register 32, a BE designation register 34a, a data pattern register 35a, and a mask address inhibit/permit register 36a.

The BE designation register 34a is used to store any one of the bit patterns which are impossible to output as illustrated in FIG. 7. The data pattern register 35a is used to store a data pattern to be assigned to the bit pattern as designated by the BE designation register 34a. More specifically speaking, for example, "0xffff" is assigned thereto in the case of "data fill" while "0x0000" is assigned thereto in the case of "data clear".

The mask address inhibit/permit register 36a is used to determine whether or not the address masked by the mask register 24a of the address information compression circuit 14 is output when the data information 38 matches data stored in the data pattern register 35a.

Six circuits 33a to 33f are provided each of which is provided with a BE designation register, a data pattern register and a mask address inhibit/permit register, for example, the BE designation register 34a, the data pattern register 35a and the mask address inhibit/permit register 36a. The number of such circuits depends upon the architecture of the microcomputer 19 and preferably corresponds to the number of the bit patterns which are impossible to output from the microcomputer 19.

Also, the inhibit/permit register 32 is provided for controlling whether or not each of the six circuits 33a to 33f is used. The inhibit/permit register 32 is a 6 bit register for controlling whether or not each of the six circuits 33a to 33f is used.

The comparing and matching circuit 39 is a circuit for comparing the data information (operand data) as acquired by the data acquisition circuit 12 with the register unit 31. If the operand data matches the data stored in the data pattern register 35a, the BE data (bit pattern information) stored in the corresponding BE designation register 34a is output. If not, the bit pattern output circuit 37 outputs the information indicative of the byte lane(s) which is judged to contain valid data by itself.

The mask address output control circuit 40 controls to output the address for masking AR[3:0]. The comparing and matching circuit 39 can output the BE data stored in the corresponding BE designation register only in the AR[3:2]=0 and that any of AR[1:0] is valid. And in case of the operand data matching the data stored in the data pattern register 35a, only AR[1:0] is output eliminating AR[3:2]. By this configuration, it is possible to minimize the packets as output from the trace data compression system 1.

Also, there can be selected an option in which the address as masked is not output. If an address area is designated by the mask address inhibit/permit register 36a to be inhibited, the address as masked is not output when data pattern matches the operand data within the address area.

In accordance with the data information compression circuit 15 of the present invention, it is possible to compress data information by outputting bit pattern information when a data pattern matches the operand data.

For example, in accordance with the embodiment of the present invention, it is possible to compress data information to cut 28 bits therefrom when the data pattern register 35a matches 32 bit operand data so that only 4 bit BE data stored in the BE designation register 34a is output.

(The Trace Data Compression Method)

Figure 8:
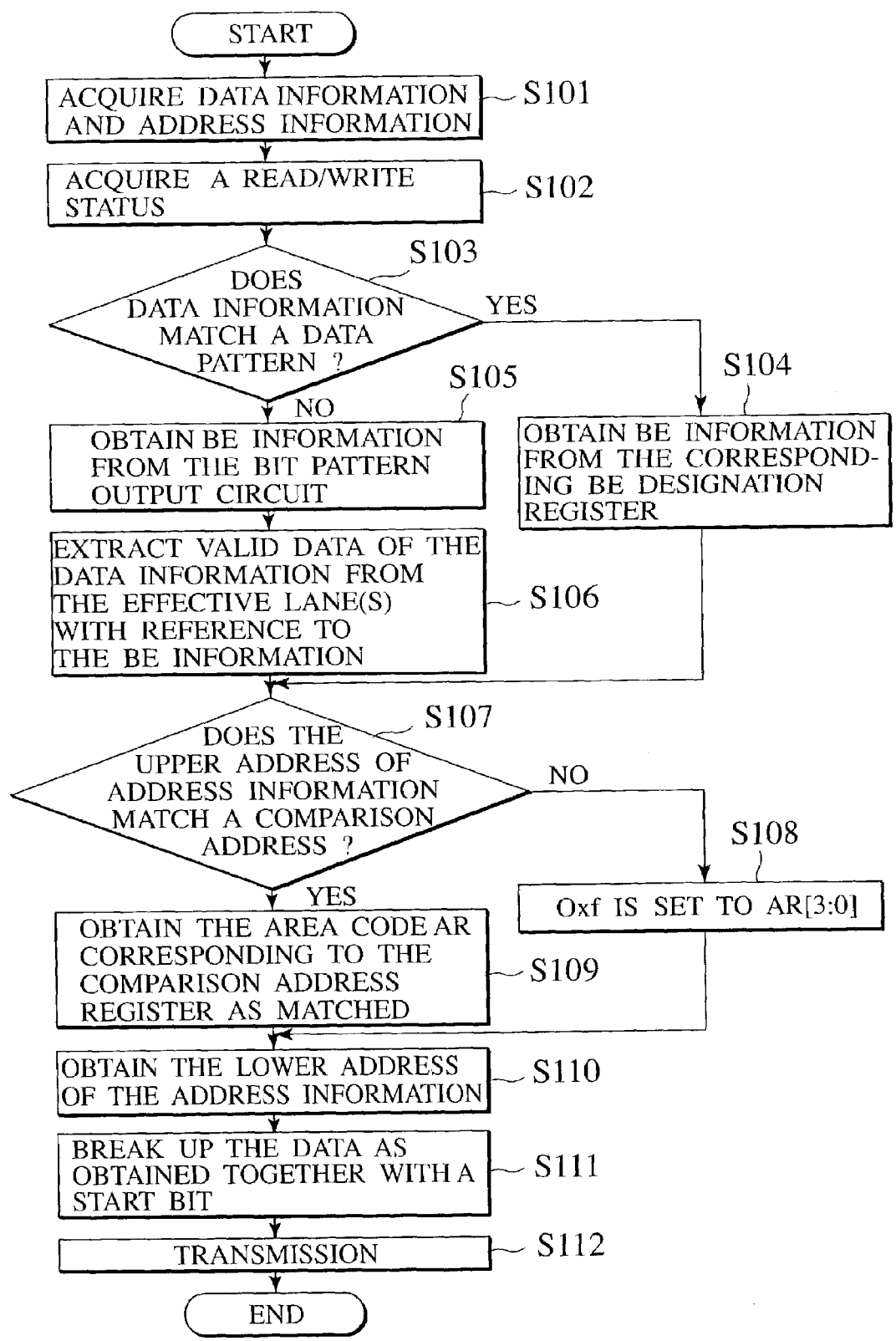
FIG. 8 is a flowchart showing a trace data compression method in accordance with the first embodiment of the present invention.

FIG. 8 is a flowchart showing a trace data compression method in accordance with the first embodiment of the present invention. The respective steps as described here are only illustrative and do not have to performed sequentially in this order.

First of all, when data access operation occurs, the data information of an operand(s) and the associated address information are acquired from the microcomputer 19 by the data acquisition circuit 12 in the step S101.

Next, the status information indicative of whether the operand is read from or written to the address is obtained in the step S102 by the read/write judgment circuit 13. In the case of the embodiment of the present invention, the status information is output as "1" when read and as "0" when written.

Next, the data information is compressed by the data information compression circuit 15 in the step S103 to the step S106.

First, in the step S103, it is judged or determined by the comparing and matching circuit 39 whether or not the operand data matches the data stored in one of the data pattern registers 35a to 35f. If the operand data matches the data stored in one of the data pattern registers 35a to 35f in the state of AR[3:2]=0 and that any of AR[1:0] is valid, BE information is obtained from the corresponding one of the BE designation registers 34a to 34f in the step S104.

In this case, the address as masked corresponding to AR[1:0] may be output by the mask address output control circuit 40 in accordance with data stored in the mask address inhibit/permit registers 36a to 36f.

If the operand data does not match the data stored in one of the data pattern registers 35a to 35f, BE information is obtained by the bit pattern output circuit 37 in the step S105, followed by extracting valid data of the data information from the effective byte lane(s) in the step S106 with reference to the BE information obtained in the step S105.

Next, the address information is compressed by the address information compression circuit 14 in the step S103 to the step S110.

First, in the step S107, it is judged or determined by the address information compression circuit 14 whether or not the upper address of the address information as acquired in the step S101 matches data stored in one of the comparison address registers 25a to 25o. If the upper address of the address information does not match data stored in any of the comparison address registers 25a to 25o, AR[3:0]=0xf is output as the area code in the step S108.

If the upper address of the address information does matches, the area code corresponding to the comparison address register as matched is obtained in the step S109.

Also, the lower address is output from the lower address output circuit 29 in the step S110.

In the step S111, the data as obtained in the step S102 to the step S111 is provided with a start bit and divided into packets, and in the step S112 the packets are transmitted by the data output circuit 17.

Figure 9:
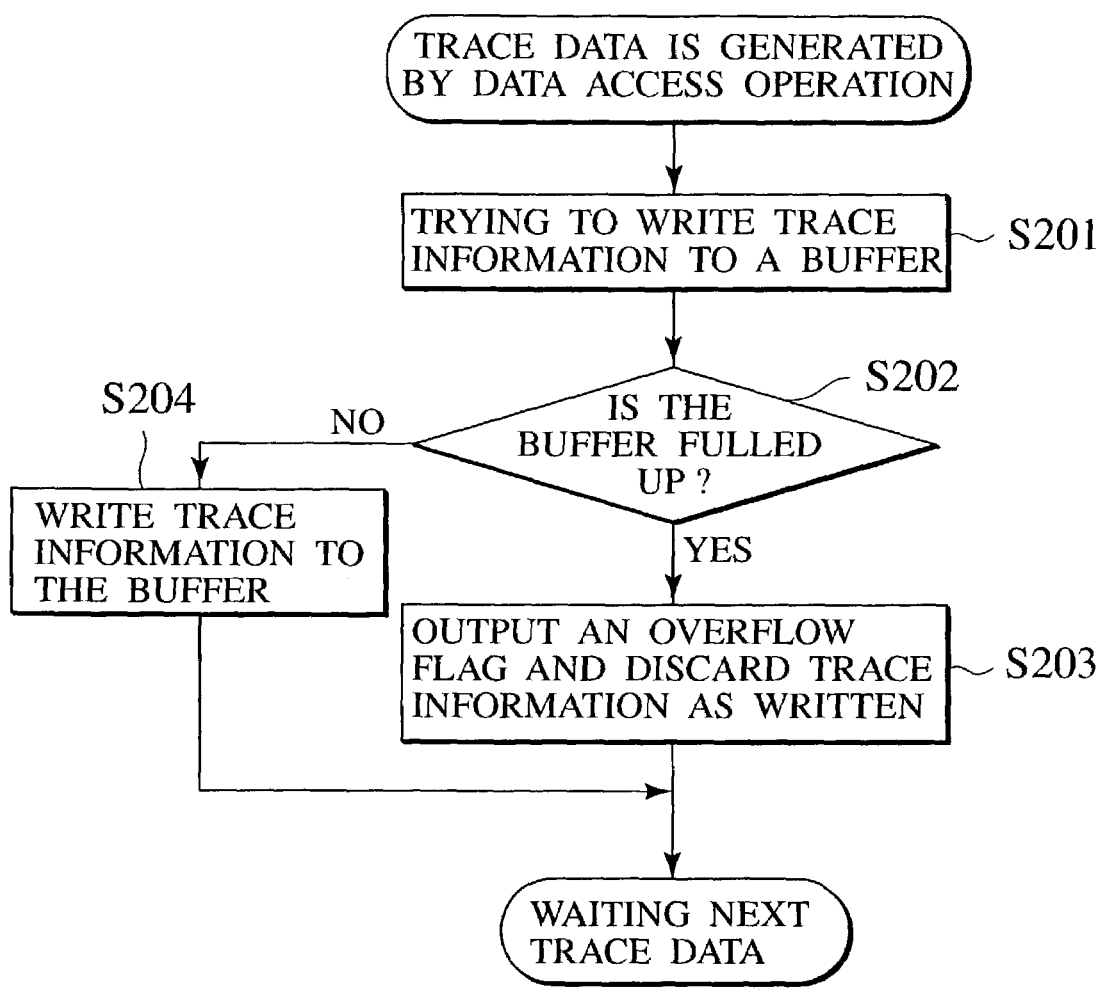
FIG. 9 is a flowchart showing the operation of the overflow monitoring circuit in accordance with the first embodiment of the present invention.

FIG. 9 is a flowchart showing the operation of the overflow monitoring circuit 16. The respective steps as described here are only illustrative and do not have to performed sequentially in this order.

First, when trace data is generated by a data access operation, the write operation is started to write the trace information to the buffer storage device 11 in the step S201.

Next, when it is judged in the step S202 that the capacity of the buffer storage device 11 is full, an overflow flag is set in the step S203 followed by discarding the trace information as written.

On the other hand, when it is judged in the step S202 that the capacity of the buffer storage device 11 is not full, the trace information is recorded to the buffer storage device 11 in the step S204. After finishing this process sequence, the system becomes ready and waiting for the next trace data.

By this configuration, since the buffer storage device 11 outputs a signal each time the buffer storage device 11 overflows, it is possible to count the number of data items which have not been successfully transferred. Also, it is possible to judge as to the timing of the overflow by synchronization at the clock frequency.

Figure 10A:
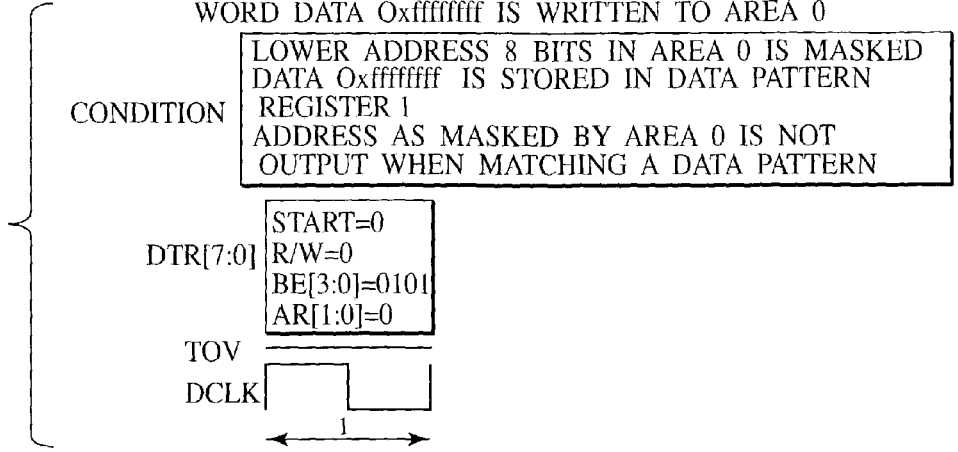
FIGS. 10A to 10C are schematic diagrams showing examples of the trace data as compressed and outputted in accordance with the first embodiment of the present invention.
Figure 10B:
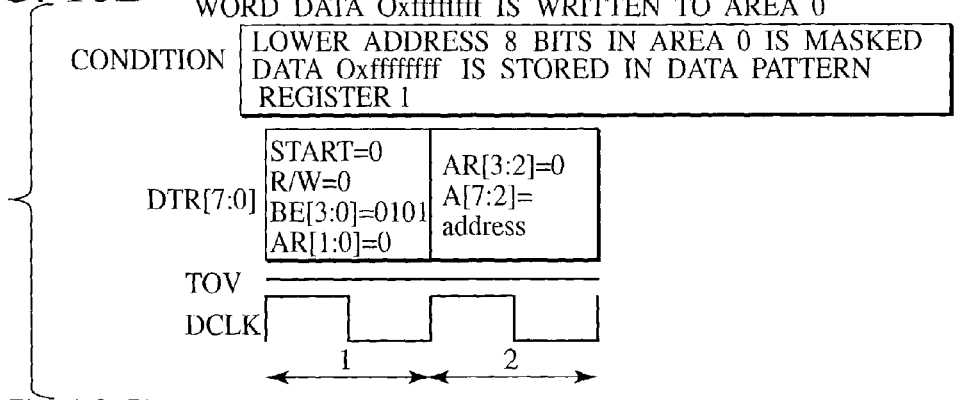
Figure 10C:
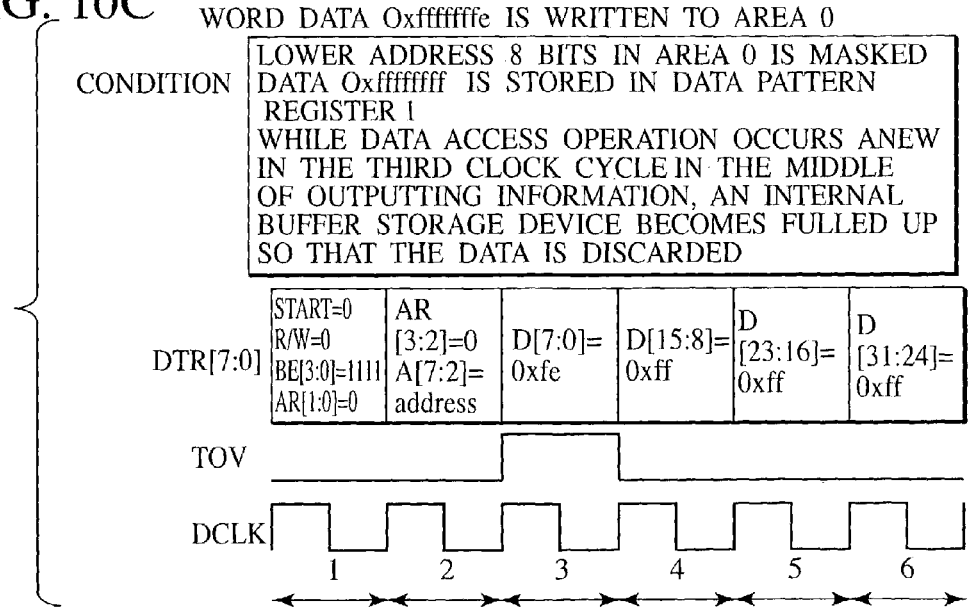

FIG. 10A to 10C are schematic diagrams showing examples of the trace data as compressed and outputted in accordance with the first embodiment of the present invention.

FIG. 10A shows exemplary output signals in the case where the word data 0xffffffff is written to the area 0.

In this case, DTR[7:0] is data which is output per clock as an 8 bit packet. TOV is an overflow flag which is output by the overflow monitoring circuit 16 as a one bit signal per clock. DCLK shows a clock signal which is output in synchronization with the operational clock frequency of the microcomputer 19 and corresponding to the data transfer rate of the debug information.

It is assumed that the trace data compression system 1 operates under the following environmental conditions.
(1) In the area 0, the low order 8 bits of addresses are masked.
(2) The data 0xffffffff is stored in the data pattern register of the area 0.
(3) The address as masked corresponding to the area 0 is not output when matching a data pattern.

First, "0" is output as a start bit. Then, since data is written, "1" is output as an R/W bit indicative of "write". Furthermore, since the data 0xffffffff as written is stored in the data pattern register, the corresponding value "0101" of the BE designation register is output as BE[3:0]. Furthermore, since the area code is 0, AR[1:0]=0 is output.

In this case, since the address as masked by the area 0 is not output, the packet data to be transferred is completely made up as illustrated in FIG. 10A so that the data is compressed into one packet as illustrated.

FIG. 10B shows exemplary output signals in the case where the word data 0xffffffff is written to the area 0 in the same manner as illustrated in FIG. 10A. However, different environments are assumed.

In this case, it is assumed that the trace data compression system 1 operates under the following environmental conditions.

(1) In the area 0, the low order 8 bits of addresses are masked.
(2) The data 0xffffffff is stored in the data pattern register of the area 0.

First, "0" is output as a start bit. Then, since data is written, "1" is output as an R/W bit indicative of "write". Furthermore, since the data 0xffffffff as written is stored in the data pattern register, the corresponding value "0101" of the BE designation register is output as BE[3:0].

Furthermore, since the area code is 0, AR[1:0]=0 is output. Thus far, the process is the same as illustrated in FIG. 10A.

Since the address as masked by the area 0 is output when matching the data pattern in the case as illustrated in FIG. 10B, a lower address is output as A[7:2]=Address (any address) padding with AR[3:2]=0.

The packet data to be transferred is completed as illustrated in FIG. 10B so that the data is compressed into two packets for transferring the data.

FIG. 10C shows exemplary output signals in the case where the word data 0xfffffffe is written to the area 0.

It is assumed that the trace data compression system 1 operates under the following environmental conditions.
(1) In the area 0, the low order 8 bits of addresses are masked.
(2) The data 0xffffffff is also stored in the data pattern register.
(3) While data access operation occurs anew in the third clock cycle in the middle of outputting information, the buffer storage device 11 becomes full so that the data is discarded.

First, "0" is output as a start bit. Then, since data is written, "1" is output as an R/W bit indicative of "write". In this case, the data 0xfffffffe as written is not stored in the data pattern register. Accordingly, BE[3:0]=1111 is output to indicate word access.

Furthermore, since the area code is 0, AR[3:0]=0 is output. However, in this case, the area code is separated into AR[1:0] and AR[3:2] in separate packets. The lower address of the address information is output as A[7:2]=Address (any address).

Then, the data as written is divided into 8 bit packets, i.e., D[7:0]=0xfe, D[15:8]=0xff, D[23:16]=0xff and D[31:24]=0xff for transfer.

In this case, while the data access operation occurs anew in the third clock cycle in the middle of outputting information, the buffer storage device 11 becomes full so that the data is discarded. Because of this, the TOV flag is set to "1" in the third clock cycle.

Figure 11:
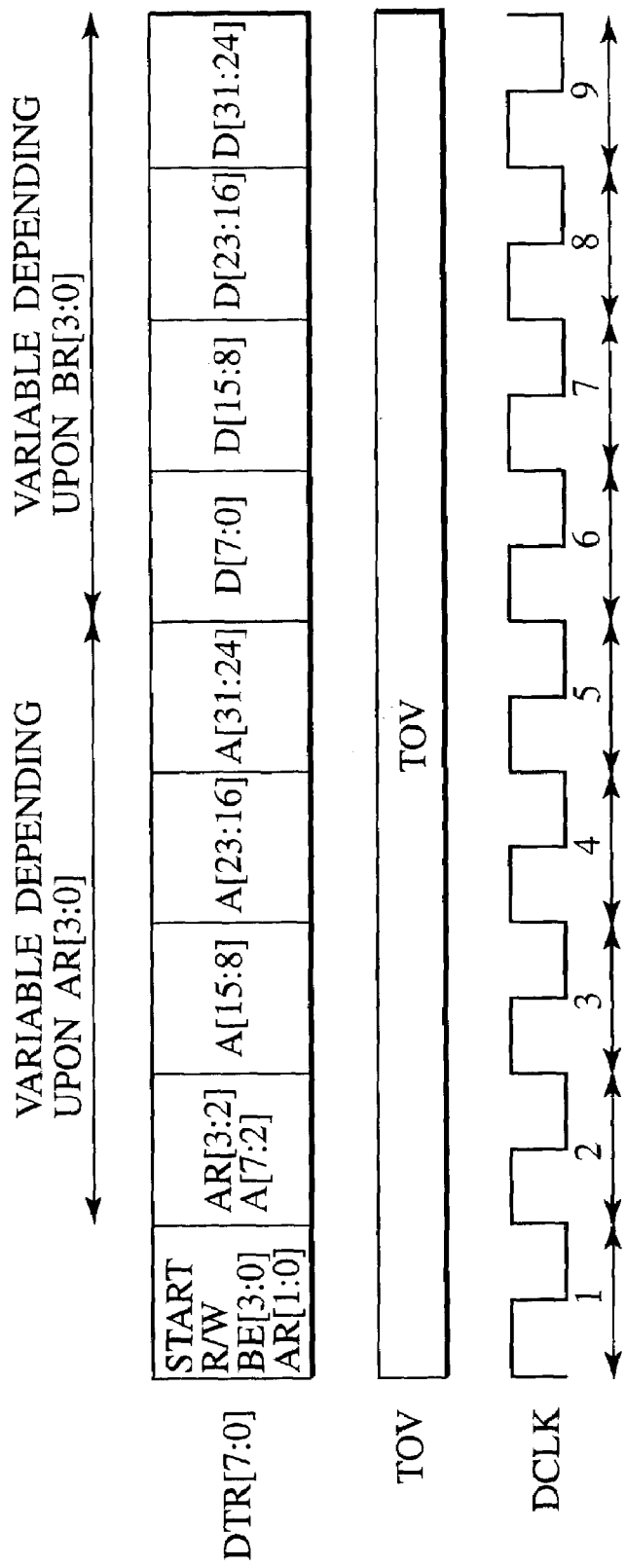
FIG. 11 is a schematic diagram showing a packet which is output from the trace data compression system in accordance with the first embodiment of the present invention.

FIG. 11 is a schematic diagram showing a packet which is output from the trace data compression system 1. The trace data compression system 1 outputs a first packet including a start bit, an R/W bit, BE[3:0], and AR[1:0] among from AR[3:0].

The second and subsequent packet(s) are variable depending upon the contents of the first packet.

The second packet can be used to output AR[3:2] from among AR[3:0] and the lower address A[7:2]. Furthermore, the third packet to the fifth packet can be used to output the lower address A[31:8]. The length of an address to be output is variable depending upon the area code while if the bit length of the upper address as designated by the area code is longer, the bit length of the lower address to be output is shorter.

The sixth packet to the ninth packet can be used to output the operand data as accessed. However, if an impossible pattern is output as BE[3:0], the data pattern is registered so that the sixth packet to the ninth packet are not output. Also, the information of an byte lane(s) which is judged to be invalid is not output so that, in such a case, the number of packets can be reduced.

In accordance with the first embodiment of the present invention, it is possible to perform data trace with fewer terminals and therefore lessen the restriction on the number of terminals available for user applications.

Furthermore, the data trace information can be output within a shorter time so that it is possible to avoid trace information from being lost.

Still further, even if the trace information is partially lost, the locations thereof and the number thereof can be known in order to determine the locations where data trace fails.

Still further, since the data trace information is patterned in advance of outputting, it is possible to hide information from a third party.

THE SECOND EMBODIMENT (Trace Data Analysis System)

The trace data analysis system 2 in accordance with a second embodiment of the present invention will be explained. The trace data analysis system 2 in accordance with the second embodiment of the present invention is a system for analyzing trace data which is compressed by the trace data compression system 1 for tracing data of the microcomputer 19 as explained in the first embodiment of the present invention.

Figure 12:
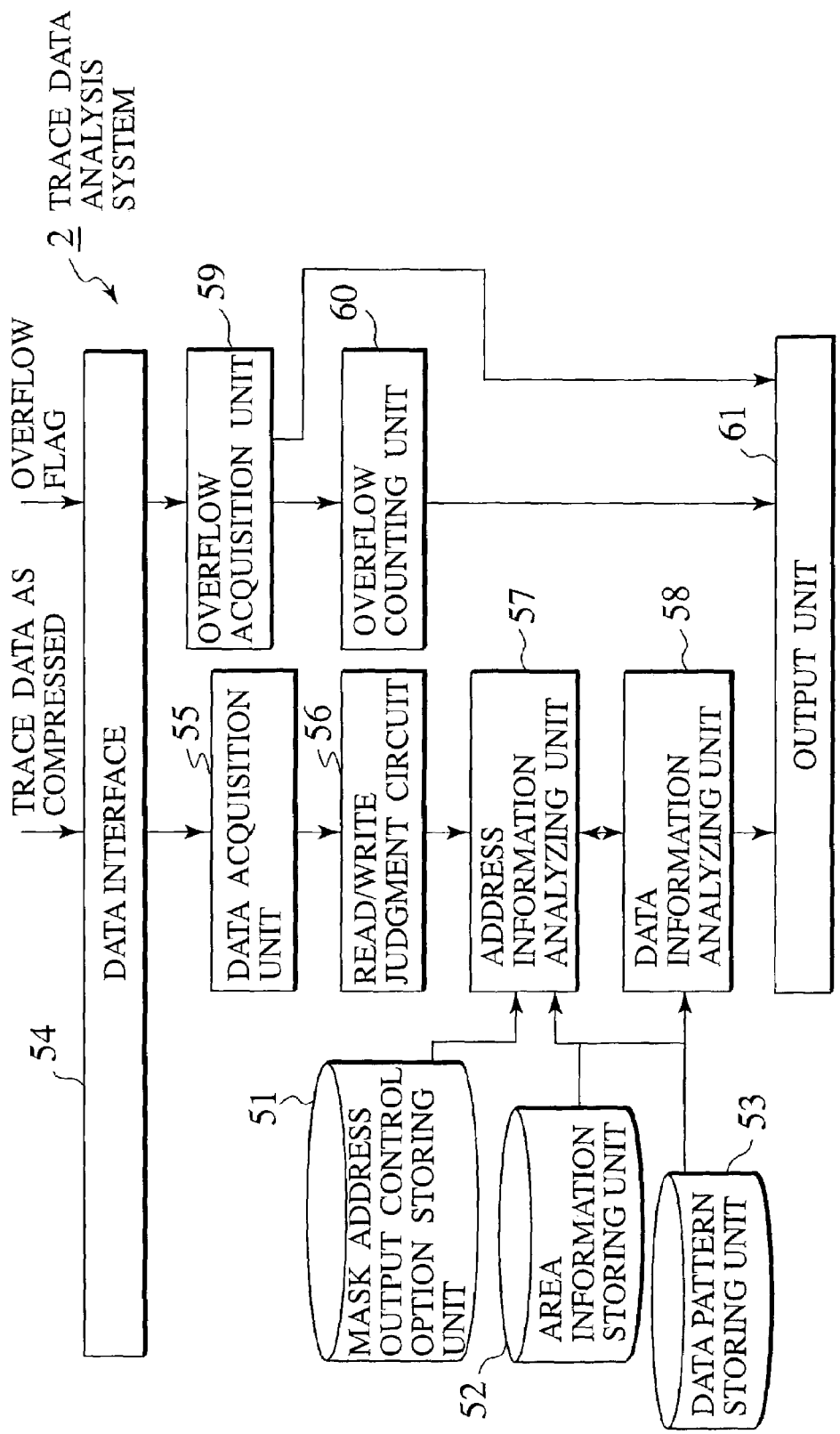
FIG. 12 is a functional block diagram showing the trace data analysis system in accordance with a second embodiment of the present invention.

FIG. 12 is a functional block diagram showing the trace data analysis system 2 in accordance with the second embodiment of the present invention.

The trace data analysis system 2 in accordance with the second embodiment of the present invention is provided with a mask address output control option storing unit 51, an area information storing unit 52, a data pattern storing unit 53, a data interface 54, a data acquisition unit 55, a read/write judgment circuit 56, an address information analyzing unit 57, a data information analyzing unit 58, an overflow acquisition unit 59, an overflow counting unit 60, and an output unit 61.

The data pattern storing unit 53 serves to assign data patterns frequently used, for example, 0xffffffff, 0x00000000 by the operation of the microcomputer 19.

The area information storing unit 52 is a storing unit serving to assign an upper address(s) of address area(s) of the microcomputer 19 frequently used to an identifier(s) which is referred to as an area code.

The mask address output control option storing unit 51 is a storing unit for designating an option of whether or not the lower address is output when the data pattern stored in the data pattern storing unit 53 matches the operand data.

The data interface 54 is an interface for receiving data as output from the trace data compression system 1, i.e., 8 bit signals for trace data and 1 bit signals for indicating overflow corresponding to the trace data compression system 1.

The data acquisition unit 55 is a unit for acquiring compressed trace data as acquired by the data interface 54. The trace data as compressed is provided with a start bit and composed of a sequence of 8 bit packets as illustrated in FIG. 11.

The read/write judgment circuit 56 is a circuit serving to judge or determine whether the data access operation is performed for reading or writing data with reference to the second bit of the first packet of the data as acquired. For example, it is judged that data is written when the second bit of the first packet is "0" and that data is read when the second bit is "1".

The address information analyzing unit 57 is a unit for acquiring the address information from the trace data as acquired and compressed.

The address information analyzing unit 57 serves to receive the third bit to the sixth bit of the first packet and judge whether or not the third to sixth bits match the BE information stored in the data pattern storing unit 53. In the case where the third to sixth bits match the BE information and where the mask address output control option storing unit 51 designates the option that the masked address is to be output, an area code is obtained by extracting the seventh and eighth bits of the first packet and the first and second bits of the second packet and then the upper address corresponding to the area code is obtained with reference to the area information storing unit 52. Also, the address information is obtained from the subsequent packet(s). In the case where the third to sixth bits do not match the BE information, an area code is obtained by extracting the seventh and eighth bits of the first packet and the first and second bits of the second packet and then the upper address corresponding to the area code is obtained with reference to the area information storing unit 52. Furthermore, a lower address is obtained with reference to the third to eighth bits of the second packet and the third to fifth packets. The upper address and the lower address as obtained are combined to obtain 32 bit address information.

The bit length of the lower address as obtained here is dependent upon the bit length of the upper address corresponding to the area code. On the other hand, if the area code as obtained is 0xf, the area code is invalid.

The data information analyzing unit 58 is a unit for acquiring the data information from the trace data acquired and compressed. The data information analyzing unit 58 serves to receive the third bit to the sixth bit of the first packet to obtain BE[3:0] as bit pattern information. The data information analyzing unit 58 furthermore receives the sixth and subsequent packet(s). The data of the sixth and subsequent packet(s) contains data in the byte lane(s) which is designated by BE as valid so that 32 bit data information can be obtained from the sixth and subsequent packet(s).

In the case of BE are impossible output pattern in the access architecture of the CPU, the access data is determined referring the table in which the predetermined access data are related to the impossible BE output pattern. Furthermore when this impossible BE output pattern is output, in the case of the mask address, that is the lower address, are prohibited to output, this analyzing are not performed because there are no AR[3:2] and lower address.

On the other hand, the overflow acquisition unit 59 is a unit for receiving the overflow flag through the data interface 54, and displaying notification of overflow in the timing of its acquisition by the output unit 61.

The overflow counting unit 60 is a unit for counting the overflow flag as received by the overflow acquisition unit 59. In this case, it is preferred to record the history of acquisition of the overflow flag corresponding to the transfer rate of the trace data as compressed.

The output unit 61 is a display system such as a CRT display, a liquid crystal display and the like, and a storage device such as a hard disk drive, a tape drive and the like. The output unit 61 is used to output information such as the address information, the data information, the overflow flag and so forth as obtained by the trace data analysis system 2.

(Trace Data Analyzing Method)

Figure 13:
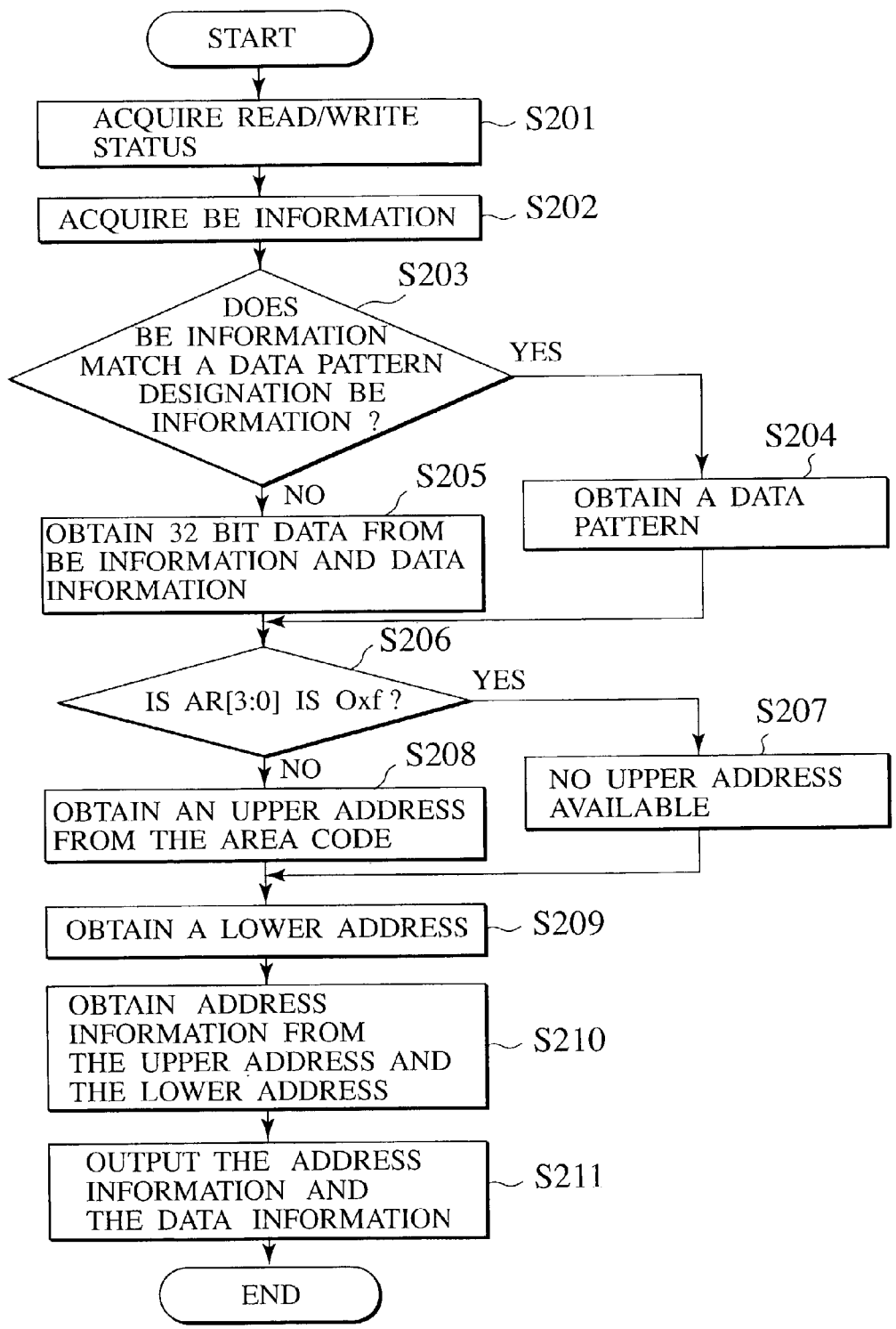
FIG. 13 is a flowchart showing a trace data analyzing method in accordance with the second embodiment of the present invention.

FIG. 13 is a flowchart showing a trace data analyzing method in accordance with the second embodiment of the present invention. The respective steps as described here are only illustrative and do not have to performed sequentially in this order.

First, in the step S201, the read/write status information is obtained by the read/write judgment circuit 56.

Next, the BE information is obtained in the step S202 and then it is judged in the step S203 whether or not the BE information as obtained in the step S202 matches the BE information corresponding to the data patterns stored in the data pattern storing unit 53. If the BE information matches, the data pattern corresponding to the BE information is obtained from the data information in the step S204.

If the BE information does not matches, 32 bit data is obtained from the BE information and the data information by the data information analyzing unit 58 in the step S205.

Next, it is judged in the step S206 whether or not the area code AR[3:0] is 0xf, by the address information analyzing unit 57. If the area code AR[3:0] is 0xf, it is determined in the step S207 not to use the upper addresses stored in the area information storing unit 52. If the area code AR[3:0] is not 0xf, the upper address corresponding to the area code is obtained in the step S208 with reference to the area information storing unit 52. Furthermore, after a lower address is obtained in the step S208, the upper address and the lower address as obtained are combined to obtain 32 bit address information in the step S210.

In the step S211, the address information and the data information as obtained are output.

FIG. 14 shows one example of trace data which is output from the trace data analysis system 2 and displayed by the output unit 61.

In the figure, the addresses, the data items, the read/write statuses associated with the respective data access operations are listed in the "ADDRS", "DATA" and "R/W" fields respectively. Furthermore, if the overflow flag is set, the fact is written in the "TOVR" field while the frequency, i.e., the number of times of discarding trace data, is also displayed.

The trace data analysis system in accordance with the second embodiment of the present invention may be implemented in a general purpose computer with the equivalent functional capabilities as described above.

In accordance with the second embodiment of the present invention, it is possible to analyze trace data with fewer terminals and therefore lessen the restriction on the number of terminals available for user applications.

Furthermore, the information of data trace can be obtained within a shorter time so that it is possible to avoid trace information from being lost.

Even if the trace information is partially lost, the locations thereof and the number thereof can be known to determine the locations where data trace fails.

THE THIRD EMBODIMENT

FIG. 15 is a functional block diagram showing a microcomputer 3 in accordance with a third embodiment of the present invention.

The microcomputer in accordance with the third embodiment of the present invention is provided with a processing circuit 4 serving to perform predetermined processing and a trace data compression circuit 5. The processing circuit 4 has functional capabilities equivalent to those of the microcomputer 19 as illustrated in FIG. 3. The trace data compression circuit 5 also has functional capabilities equivalent to those of the trace data compression system 1 in accordance with the first embodiment of the present invention as illustrated in FIG. 3.

Namely, the microcomputer in accordance with the third embodiment of the present invention is a microcomputer provided with the trace data compression circuit 5 as a built-in circuit.

In accordance with the microcomputer of the third embodiment of the present invention, it is possible to output trace data with fewer terminals and therefore lessen the restriction on the number of terminals available for user applications.

THE FOURTH EMBODIMENT

FIG. 16 is a system organization diagram showing a data trace system in accordance with a fourth embodiment of the present invention.

The data trace system in accordance with the fourth embodiment of the present invention is provided with the trace data compression system 1 and the trace data analysis system 2. In this case, the trace data compression system 1 is the trace data compression system 1 as explained above in conjunction with the first embodiment of the present invention while the trace data analysis system 2 is the trace data analysis system 2 as explained above in conjunction with the second embodiment of the present invention.

In accordance with the data trace system of the fourth embodiment of the present invention, it is possible to compress and analyze trace data under the rule same between the trace data compression system and trace data analysis system and therefore to implement effective data trace functionality.

THE FIFTH EMBODIMENT

The data trace system in accordance with a fifth embodiment of the present invention will be explained. The data trace system in accordance with the fifth embodiment of the present invention implements trace functionality by means of a trace data compression system 1 and trace data analysis system 2 which operate under the same rule while compression and analysis rules are modified, as discussed below.

Figure 17:
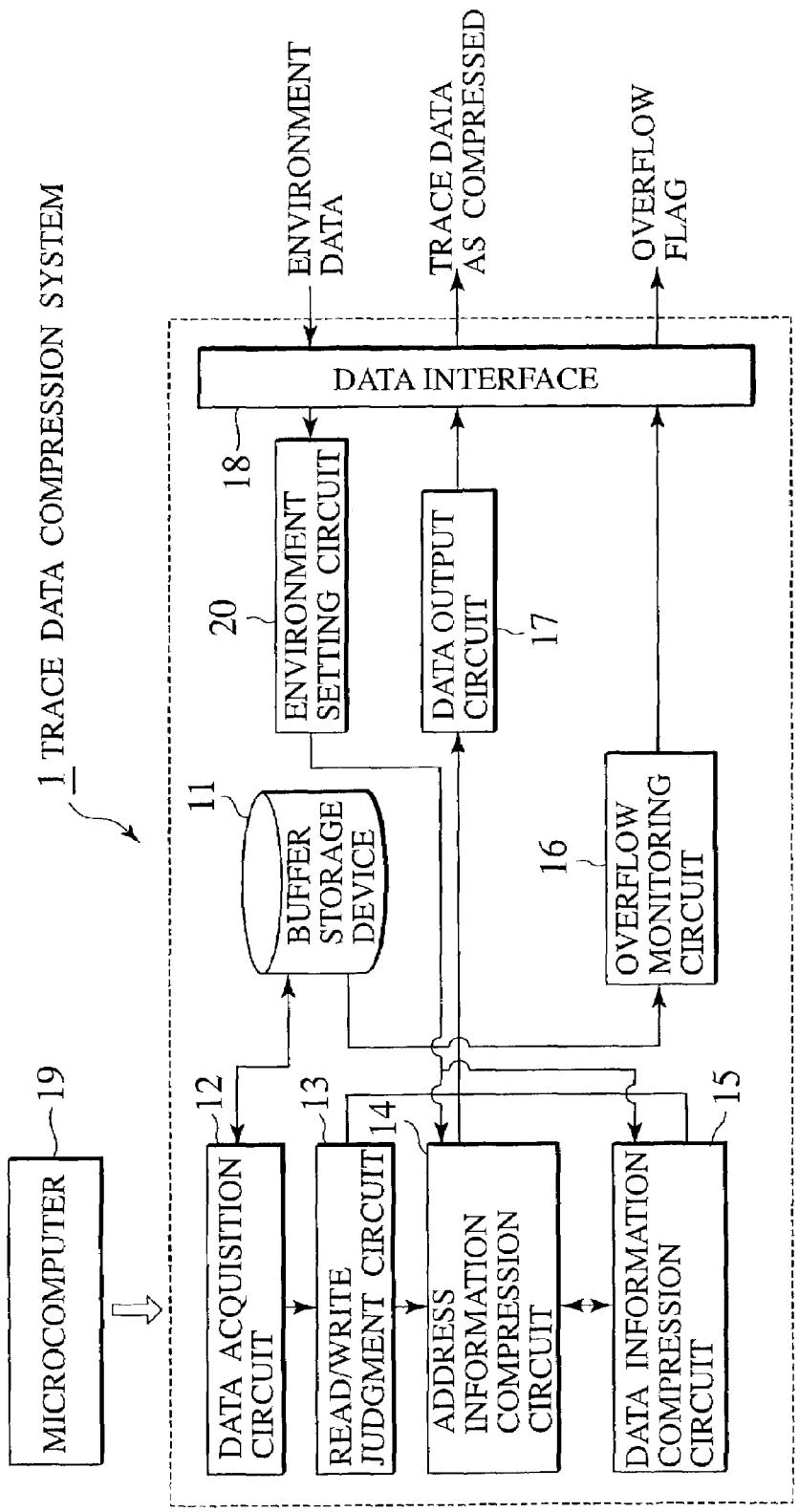
FIG. 17 is a functional block diagram showing the trace data compression system of a data trace system in accordance with a fifth embodiment of the present invention.

FIG. 17 is a functional block diagram showing the trace data compression system 1 of the data trace system in accordance with the fifth embodiment of the present invention.

The trace data compression system 1 as illustrated in FIG. 17 is different from the trace data compression system 1 in accordance with the first embodiment of the present invention in that an environment setting circuit 20 is provided.

The environment setting circuit 20 is a circuit for changing the area codes, the data patterns, the BE information and other environmental values which are assigned in the address information compression circuit 14 and the data information compression circuit 15.

More specifically, the environment setting circuit 20 can be used to change information such as the upper addresses of frequently accessed address areas which are stored in the comparison address registers 25a to 25o, the area codes corresponding thereto, the data patterns frequently output and stored in the data pattern register 35a of the data information compression circuit 15, and the BE information corresponding thereto. Furthermore, it is possible to set an option as to whether or not the masked address is to be output.

The environment setting circuit 20 sets the environment with reference to environment data as received from the trace data analysis system 2. Furthermore, in the case where a previous environment exists, the previous environment can be changed.

Figure 18:
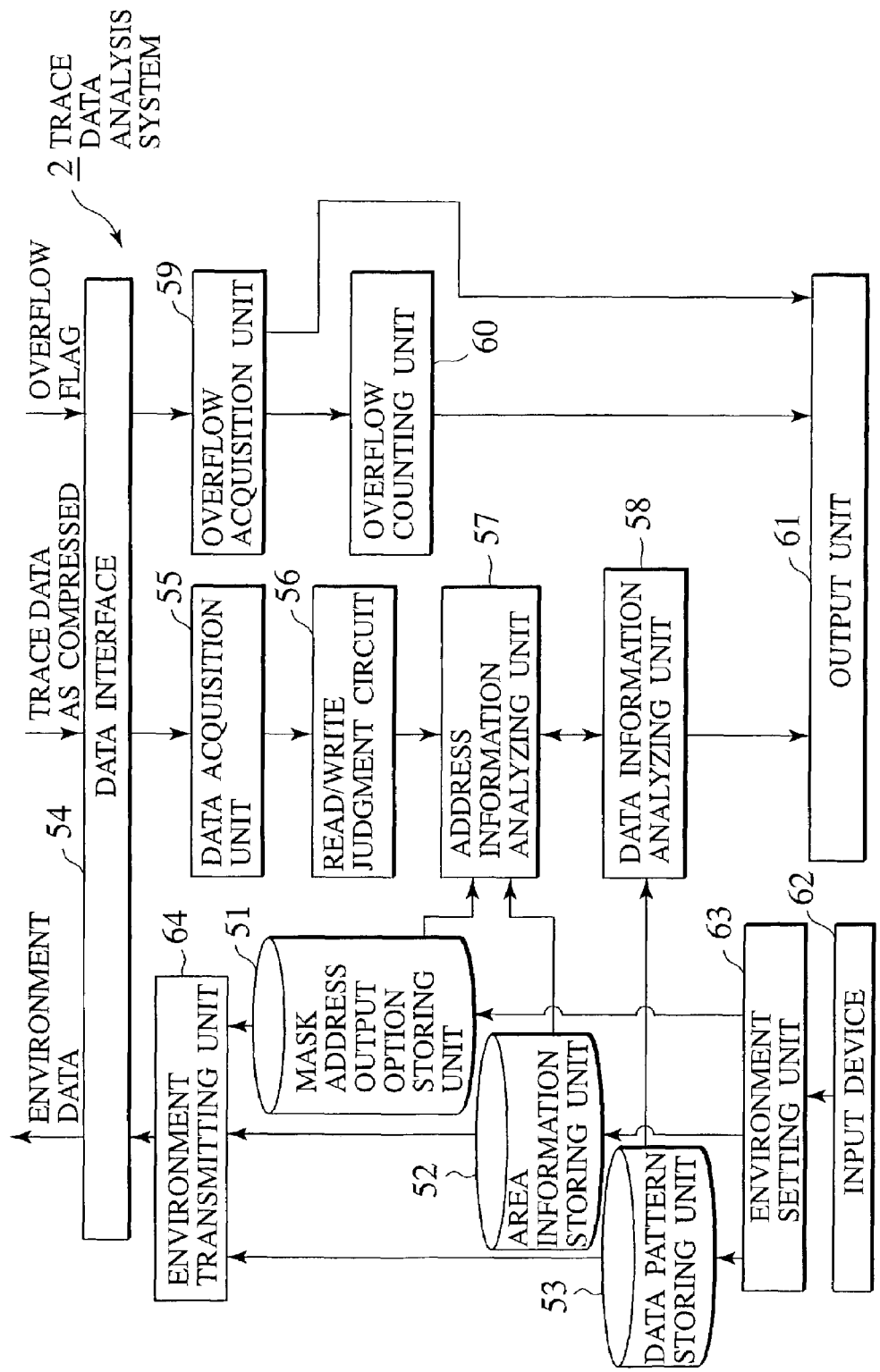
FIG. 18 is a functional block diagram showing the trace data analysis system of the data trace system in accordance with the fifth embodiment of the present invention.

FIG. 18 is a functional block diagram showing the trace data analysis system 2 of the data trace system in accordance with the fifth embodiment of the present invention.

The trace data analysis system 2 as illustrated in FIG. 18 is different from the trace data analysis system 2 in accordance with the second embodiment of the present invention in that an input device 62, an environment setting unit 63 and an environment transmitting unit 64 are provided. The input device 62 is a conventional input device such as a mouse, or a keyboard.

The environment setting unit 63 is a unit for automatically setting the environment in the mask address output control option storing unit 51, the area information storing unit 52 and the data pattern storing unit 53 with reference to a predetermined file, such as a configuration file as output from a compiler.

Also, the environment setting unit 63 can be used to manually set the environment by manipulating the input device 62.

The environment transmitting unit 64 is a unit for transmitting the environment data which is set in the mask address output control option storing unit 51, the area information storing unit 52 and the data pattern storing unit 53 through the data interface 54 to the trace data compression system 1.

In accordance with the data trace system of the fifth embodiment of the present invention, it is possible to repeat data trace with the trace data compression system 1 and the trace data analysis system 2 under the same rule after changing current data of the environment

OTHER EMBODIMENTS

As described above, while the present invention has been described in terms of the first to fifth embodiments of the present invention, the present invention should not be limited to the description and drawings as part of the disclosure. Various alternative embodiments, practical applications and implementations will be apparent to those skilled in the art from the disclosure.

The circuits, units and so forth as explained in conjunction with the embodiments of the present invention may operate in parallel. For example, in the case of the trace data compression system in accordance with the first embodiment of the present invention, it is possible to operate the read/write judgment circuit 13, the address information compression circuit 14 and the data information compression circuit 15 in parallel with each other after the address information and the data information are acquired.

Various modifications will become possible for those skilled in the art after receiving the teachings of the present disclosure without departing from the scope thereof.

What is claimed is:

1. A trace data compression system comprising:
   a data acquisition circuit which is configured to acquire address information for identifying an address for at least one of reading and writing operation of a microcomputer which performs predetermined processing, and data information as operand data stored in said address;
   an address information compression circuit which is configured to compress said address information acquired by said data acquisition circuit and output said address information as compressed address information;
   a data information compression circuit which is configured to compress said data information acquired by said data acquisition circuit and output said data information as compressed data information;
   a data output circuit which is configured to output variable length data containing said compressed address information outputted by the address information compression circuit and said compressed data information outputted by the data information compression circuit
   wherein said address information compression circuit comprises:
   a comparison address register which is configured to store an upper address which is frequently accessed;
   a mask register which is configured to mask data stored in said comparison address register;
   a comparing and matching circuit which is configured to compare an upper address of said address as acquired by said data acquisition circuit with said upper address which is frequently accessed as stored in said comparison address register, and to output an identifier of said upper address which is frequently accessed and matches said upper address of said address as acquired by said data acquisition circuit; and
   a lower address output circuit which is configured to output a lower address of said address as acquired by said data acquisition circuit; and
   wherein said data information compression circuit comprises:
   a bit pattern output circuit which is configured to output bit pattern information, wherein said data information is divided into a plurality of lanes, wherein a valid lane of said lanes containing valid information and an invalid lane of said lanes containing no valid information are determined by said bit pattern information,
   a bit pattern designation register which is configured to store predetermined bit pattern information having a predetermined fixed length, wherein said data information is divided into a plurality of lanes, wherein a valid lane of said lanes containing valid information and an invalid lane of said lanes containing no valid information are determined by said bit pattern information, wherein said bit pattern designation register is configured to store said predetermined bit pattern information corresponding to an infeasible arrangement of valid and invalid lanes,
   a data pattern register which is configured to store predetermined data information assigned to the predetermined bit pattern information corresponding to the infeasible arrangement of valid and invalid lanes, and
   a comparing and matching circuit which is configured to output the predetermined bit pattern information of said predetermined fixed length stored in said bit pattern designation register corresponding to said data pattern register when said data information matches said predetermined data information stored in the data pattern register, and to output said data information if said data information does not match said predetermined data information stored in the data pattern register.

2. The trace data compression system as set forth in claim 1 wherein
   said data output circuit outputs said variable length data after dividing up said variable length data into packets.

3. The trace data compression system as set forth in claim 1 further comprising
a buffer storage control circuit which is configured to store said address information and said data information acquired by said data acquisition circuit in the buffer storage device,
wherein said data acquisition circuit acquires said address information and said data information from said buffer storage device.

4. The trace data compression system as set forth in claim 3 further comprising
an overflow monitoring circuit which is configured to monitor access to said buffer storage device and to generate an overflow signal when a writing operation is performed which exceeding the storage capacity of said buffer storage device.

5. The trace data compression system as set forth in claim 1 further comprising a read/write judgment circuit which is configured to output a signal indicative of whether said microcomputer accesses said address for said at least one of reading and writing said data.

6. A trace data compression method comprising:
a step of acquiring address information for identifying an address for at least one of reading and writing operation of a microcomputer which performs predetermined processing, and data information as operand data stored in said address;
a step of compressing said address information acquired by said data acquisition circuit and output said address information as compressed address information;
a step of compressing said data information acquired by said data acquisition circuit and output said data information as compressed data information;
a step of outputting variable length data containing said compressed address information outputted by the address information compression circuit and said data compressed information outputted by the data information compression circuit,
wherein said address information compressing step comprises:
a step of storing an upper address which is frequently accessed in a comparison address register in advance;
a step of masking said comparison address register with a mask register;
a step of comparing an upper address of said address as acquired by said data acquisition circuit with said upper address which is frequently accessed as stored in said comparison address register, and outputting an identifier of said upper address which is frequently accessed and matches said upper address of said address as acquired by said data acquisition circuit; and
a step of outputting a lower address of said address as acquired by said data acquisition circuit and
wherein said data information compression step includes:
a step of outputting bit pattern information, wherein said data information is broken into a plurality of lanes, wherein a valid lane(s) of said lanes containing valid information and an invalid lane(s) of said lanes containing no valid information are determined by said bit pattern information,
a step of storing predetermined bit pattern information having a predetermined fixed length in a bit pattern designation register, wherein said data information is broken into a plurality of lanes, wherein a valid lane(s) of said lanes containing valid information and an invalid lane(s) of said lanes containing no valid information are determined by said bit pattern information, wherein said predetermined bit pattern information corresponding to an impossible arrangement of valid and invalid lanes is stored,
a step of storing predetermined data information assigned to the predetermined bit pattern information corresponding to the impossible arrangement of valid and invalid lanes in a data pattern register, and
a step of outputting the predetermined bit pattern information of said predetermined fixed length stored in said bit pattern designation register corresponding to said data pattern register if said data information matches said data pattern register, and outputting said data information if said data information does not match said data pattern register.

7. A microcomputer capable of performing predetermined processing and implemented with a built-in trace data compression circuit which is configured to trace data as processed by said predetermined processing, said microcomputer comprising:
a circuit which is configured to perform said predetermined processing;
a data acquisition circuit which is configured to acquire address information and data information relating to data access operation of said circuit;
an address information compression circuit which is configured to compress said address information having been acquired by said data acquisition circuit and output said address information as compressed;
a data information compression circuit which is configured to compress said data information having been acquired by said data acquisition circuit and output said data information as compressed;
a data output circuit which is configured to output variable length data containing said address information having been compressed and output by the address information compression circuit and said data information having been compressed and output by the data information compression circuit,
wherein said address information compression circuit comprises:
a comparison address register which is configured to store an upper address which is frequently accessed;
a mask register which is configured to mask data stored in said comparison address register;
a comparing and matching circuit which is configured to compare an upper address of said address as acquired by said data acquisition circuit with said upper address which is frequently accessed as stored in said comparison address register, and to output an identifier of said upper address which is frequently accessed and matches said upper address of said address as acquired by said data acquisition circuit; and
a lower address output circuit which is configured to output a lower address of said address as acquired by said data acquisition circuit and
wherein said address information compression circuit comprises:
a bit pattern output circuit which is configured to output bit pattern information, wherein said data information is broken into a plurality of lanes, wherein a valid lane(s) of said lanes containing valid information and an invalid lane(s) of said lanes containing no valid information are determined by said bit pattern information, a bit pattern designation register which is configured to store predetermined bit pattern information having a predetermined fixed length, wherein said data information is broken into a plurality of lanes, wherein a valid lane(s) of said lanes containing valid information and an invalid lane(s) of said lanes containing no valid information are determined by said bit pattern information, wherein said bit pattern designation register is configured to store said predetermined bit pattern information corresponding to an impossible arrangement of valid and invalid lanes, a data pattern register which is configured to store predetermined data information assigned to the predetermined bit pattern information corresponding to the impossible arrangement of valid and invalid lanes, and a comparing and matching circuit which is configured to output the predetermined bit pattern information of said predetermined fixed length stored in said bit pattern designation register corresponding to said data pattern register if said data information matches said data pattern register, and to output said data information if said data information does not match said data pattern register.

* * * * *